United States Patent
Derby, V et al.

(10) Patent No.: US 7,168,227 B2
(45) Date of Patent: Jan. 30, 2007

(54) INTERNAL COMBUSTION ENGINE TRACTION DRIVE WITH ELECTRIC CUTTING UNIT DRIVE FOR WALKING GREENS MOWER

(75) Inventors: Harry L. Derby, V, Charlotte, NC (US); Bryan E. Holby, Charlotte, NC (US)

(73) Assignee: Textron Inc., Providence, RI (US)

( * ) Notice: Subject to any disclaimer, the term of this patent is extended or adjusted under 35 U.S.C. 154(b) by 98 days.

(21) Appl. No.: 10/851,987

(22) Filed: May 21, 2004

(65) Prior Publication Data

US 2005/0257512 A1   Nov. 24, 2005

(51) Int. Cl.
*A01D 34/53*  (2006.01)

(52) U.S. Cl. .................... 56/10.2 G; 56/249

(58) Field of Classification Search .............. 56/13.5, 56/249, 252, 10.2 R, 10.2 G
See application file for complete search history.

(56) References Cited

U.S. PATENT DOCUMENTS

| | | | |
|---|---|---|---|
| 1,401,156 A | 12/1921 | Jenkins | |
| 1,947,117 A * | 2/1934 | Stegeman et al. | 56/11.5 |
| 2,417,613 A | 3/1947 | Radabaugh | |
| 2,523,014 A | 9/1950 | Gooch | |
| 2,702,448 A | 2/1955 | Smith | |
| 3,090,184 A | 5/1963 | Hadek | |
| 3,103,090 A | 9/1963 | Campbell | |
| 3,106,811 A | 10/1963 | Heth et al. | |
| 3,217,824 A | 11/1965 | Jepson | |
| 3,230,695 A | 1/1966 | West | |
| 3,301,494 A | 1/1967 | Peot et al. | |
| 3,339,353 A | 9/1967 | Schreyer | |
| 3,404,518 A | 10/1968 | Kasper | |
| 3,425,197 A | 2/1969 | Kita | |
| 3,429,110 A | 2/1969 | Strasel | |
| 3,472,005 A | 10/1969 | Profenna | |
| 3,496,706 A | 2/1970 | Mattson | |
| 3,511,033 A | 5/1970 | Strasel | |
| 3,570,226 A | 3/1971 | Haverkamp et al. | |
| 3,572,455 A | 3/1971 | Brueske | |

(Continued)

FOREIGN PATENT DOCUMENTS

EP         0 589 516 A2        3/2001

(Continued)

OTHER PUBLICATIONS

Greens King Electric, Electric Triplex Greens Mower, GCSAA Show 1997, Las Vegas.

*Primary Examiner*—Meredith C. Petravick
(74) *Attorney, Agent, or Firm*—Harness, Dickey & Pierce P.L.C.

(57) ABSTRACT

A walk-behind greens mower having a mobile structure and a ground engaging traction member rotatably coupled to the mobile structure. The ground engaging traction member imparts traction movement to the mobile structure for movement on the ground at a ground speed. An internal combustion engine is supported on the mobile structure and outputs a driving force to the ground engaging traction member. A bed knife is supported by the mobile structure having a cutting edge that cooperates with a grass cutting reel rotatably supported on the mobile structure. An electric motor supported on the mobile structure rotatably driving the grass cutting reel at a rotational speed that can vary depending upon the detected ground speed.

13 Claims, 1 Drawing Sheet

U.S. PATENT DOCUMENTS

| | | |
|---|---|---|
| 3,581,480 A | 6/1971 | O'Conner et al. |
| 3,602,772 A | 8/1971 | Hundhausen et al. |
| 3,603,065 A | 9/1971 | Weber |
| 3,608,284 A | 9/1971 | Erdman |
| 3,608,285 A | 9/1971 | Berk |
| 3,612,573 A | 10/1971 | Hoffman |
| 3,613,337 A | 10/1971 | Akgulian et al. |
| 3,631,659 A | 1/1972 | Horowitz |
| 3,641,749 A | 2/1972 | Dwyer, Jr. et al. |
| 3,650,097 A | 3/1972 | Nokes |
| 3,668,499 A | 6/1972 | Malloy |
| 3,668,844 A | 6/1972 | Akgulian et al. |
| 3,696,593 A | 10/1972 | Thorud et al. |
| 3,698,523 A | 10/1972 | Bellinger |
| 3,721,076 A | 3/1973 | Behrens |
| 3,729,912 A | 5/1973 | Weber |
| 3,731,469 A | 5/1973 | Akgulian et al. |
| 3,732,671 A | 5/1973 | Allen et al. |
| 3,732,673 A | 5/1973 | Winn, Jr. |
| 3,742,685 A | 7/1973 | Lian et al. |
| 3,759,019 A | 9/1973 | Wells |
| 3,796,277 A | 3/1974 | Gordon |
| 3,800,480 A | 4/1974 | Keating |
| 3,809,975 A | 5/1974 | Bartels |
| 3,832,835 A | 9/1974 | Hall et al. |
| 3,841,069 A | 10/1974 | Weck |
| 3,895,481 A | 7/1975 | Olney et al. |
| 3,910,016 A | 10/1975 | Saiia et al. |
| 3,918,240 A | 11/1975 | Haffner et al. |
| 3,927,389 A | 12/1975 | Kita |
| 3,958,398 A | 5/1976 | Fuelling, Jr. et al. |
| 3,992,858 A | 11/1976 | Hubbard et al. |
| 3,999,643 A | 12/1976 | Jones |
| 4,021,996 A | 5/1977 | Bartlett et al. |
| 4,024,448 A | 5/1977 | Christianson et al. |
| 4,048,366 A | 9/1977 | Kingsbury |
| 4,064,680 A | 12/1977 | Fleigle |
| 4,145,864 A | 3/1979 | Brewster, Jr. |
| 4,161,858 A | 7/1979 | Gerrits |
| 4,180,964 A | 1/1980 | Pansire |
| 4,265,146 A | 5/1981 | Horrell |
| 4,301,881 A | 11/1981 | Griffin |
| 4,306,402 A | 12/1981 | Whimp |
| 4,306,404 A | 12/1981 | Szymanis et al. |
| 4,307,559 A | 12/1981 | Jupp et al. |
| 4,312,421 A | 1/1982 | Pioch |
| 4,318,266 A | 3/1982 | Taube |
| 4,330,981 A | 5/1982 | Hall et al. |
| 4,333,302 A | 6/1982 | Thomas et al. |
| 4,335,569 A | 6/1982 | Keeney et al. |
| 4,370,846 A | 2/1983 | Arnold |
| 4,395,865 A | 8/1983 | Davis, Jr. et al. |
| 4,423,794 A | 1/1984 | Beck |
| 4,430,604 A | 2/1984 | Loganbill et al. |
| 4,479,346 A | 10/1984 | Chandler |
| 4,487,006 A | 12/1984 | Scag |
| 4,522,165 A | 6/1985 | Ogawa |
| 4,559,768 A | 12/1985 | Dunn |
| 4,589,249 A | 5/1986 | Walker et al. |
| 4,642,976 A | 2/1987 | Owens |
| 4,663,920 A | 5/1987 | Skovhoj |
| 4,667,460 A | 5/1987 | Kramer |
| 4,686,445 A | 8/1987 | Phillips |
| 4,753,318 A | 6/1988 | Mizuno et al. |
| 4,756,375 A | 7/1988 | Ishikura et al. |
| 4,770,595 A | 9/1988 | Thompson et al. |
| 4,815,259 A | 3/1989 | Scott |
| 4,866,917 A | 9/1989 | Phillips et al. |
| 4,870,811 A | 10/1989 | Steele |
| 4,882,896 A | 11/1989 | Wilcox |
| 4,897,013 A | 1/1990 | Thompson et al. |
| 4,920,733 A | 5/1990 | Berrios |
| 4,943,758 A | 7/1990 | Tsurumiya |
| 4,964,265 A | 10/1990 | Young |
| 4,964,266 A | 10/1990 | Kolb |
| 4,967,543 A | 11/1990 | Scag et al. |
| 4,987,729 A | 1/1991 | Paytas |
| 4,995,227 A | 2/1991 | Foster |
| 5,042,236 A | 8/1991 | Lamusga et al. |
| 5,042,239 A | 8/1991 | Card |
| 5,062,322 A | 11/1991 | Sinko |
| 5,069,022 A | 12/1991 | Vandermark |
| 5,085,043 A | 2/1992 | Hess et al. |
| 5,097,923 A | 3/1992 | Ziegler et al. |
| 5,123,234 A | 6/1992 | Harada et al. |
| 5,133,174 A | 7/1992 | Parsons, Jr. |
| 5,135,066 A | 8/1992 | Kashihara |
| 5,140,249 A | 8/1992 | Linder et al. |
| 5,150,021 A | 9/1992 | Kamono et al. |
| 5,163,273 A | 11/1992 | Wojtkowski et al. |
| 5,203,147 A | 4/1993 | Long |
| 5,204,814 A | 4/1993 | Noonan et al. |
| 5,253,729 A | 10/1993 | Suzuki |
| 5,261,213 A | 11/1993 | Humphrey |
| 5,301,494 A | 4/1994 | Peot et al. |
| 5,309,699 A | 5/1994 | Ehn |
| 5,319,368 A | 6/1994 | Poholek |
| 5,323,593 A | 6/1994 | Cline et al. |
| 5,330,138 A | 7/1994 | Schlessmann |
| 5,343,680 A | 9/1994 | Reichen et al. |
| 5,406,778 A | 4/1995 | Lamb et al. |
| 5,415,245 A | 5/1995 | Hammond |
| 5,459,984 A | 10/1995 | Reichen et al. |
| 5,482,135 A | 1/1996 | Phillips et al. |
| 5,497,604 A | 3/1996 | Lonn |
| 5,540,037 A | 7/1996 | Lamb et al. |
| 5,692,053 A | 11/1997 | Fuller et al. |
| 5,794,422 A | 8/1998 | Reimers et al. |
| 6,039,009 A | 3/2000 | Hirose |
| 6,044,922 A | 4/2000 | Field |
| 6,082,084 A | 7/2000 | Reimers et al. |
| 6,430,902 B1 | 8/2002 | Saiia |
| 6,449,934 B1 | 9/2002 | Reimers et al. |
| 6,487,837 B1 * | 12/2002 | Fillman et al. ............... 56/11.9 |
| 6,491,133 B2 | 12/2002 | Yamada et al. |
| 6,591,593 B1 | 7/2003 | Brandon et al. |
| 6,604,348 B2 | 8/2003 | Hunt |
| 6,622,464 B2 * | 9/2003 | Goman et al. ............... 56/16.9 |
| 6,644,004 B2 | 11/2003 | Reimers et al. |

FOREIGN PATENT DOCUMENTS

| | | |
|---|---|---|
| GB | 1197719 | 7/1970 |
| GB | 2 388 291 | 11/2003 |
| JP | 05328814 A | 12/1993 |
| JP | 2001-106042 | 4/2001 |

\* cited by examiner

INTERNAL COMBUSTION ENGINE TRACTION DRIVE WITH ELECTRIC CUTTING UNIT DRIVE FOR WALKING GREENS MOWER

FIELD OF THE INVENTION

An example embodiment of the present invention in general relates to a greens mower having an internal combustion engine traction drive and an electric cutting unit drive.

BACKGROUND OF THE INVENTION

As is known in the prior art, greens mowers are particularly useful in mowing golf course greens, which are known to require exacting mowing results to assure that the grass is cut consistently throughout the green. Traditionally, these greens mowers are either walk-behind type mowers or riding mowers.

Greens mowers generally employ a reel type mowing unit as opposed to a rotary type mowing unit. The clip rate of these reel type mowing units are of utmost concern due to the fact that the clip rate often determines the consistency and quality of the cut, which leads to improved turf health. Because of the time required to grow a mature green and the cost associated with therewith, it is extremely important that greens mowers operate properly and not damage the turf.

The term clip rate is generally understood to mean the ratio between the rotational speed of the reel and the corresponding speed of the traction or drive unit. The clip rate can often be measured by the distance between the locations of individual sequential grass cuts produced by the rotating reel blades successively moving over the grass. The grass between the locations of the cuts will necessarily be left taller than the cut grass at the cut locations. Consequently, the cut rate is vital to producing an optimum condition of the grass on the golf course green.

Golf course greens maintenance equipment traditionally has utilized internal combustion engines. A number of greens mowers are known in the art. Some are discussed in U.S. Pat. Nos. 3,429,110, and 4,024,996. Riding greens mowers with multiple or gang mowing units are the subject of U.S. Pat. Nos. 3,511,033, 3,668,844, 4,866,918, and 5,042,236. All of the recited patents referenced above are incorporated herein by reference. The mowers discussed in these patents all rely on an internal combustion engine as the primary source of power and a complex drive mechanism of drive belts, gears, and/or chains or a hydrostatic system for supplying power to the ground engaging wheels and additionally to the reel mowing units. However, there are a number of disadvantages associated with the use of a greens mower employing an internal combustion engine to power both the drive mechanism and the mowing unit.

As will be appreciated by one skilled in the art, traditionally internal combustion powered greens mowers have a first disadvantage of preventing quick and convenient variation of the clip rate, because of the fixed mechanical relationship between the drive mechanism and the mowing unit. In other words, the fixed gear ratio defined by the drive belts, gears, and/or chains does not facilitate quick and convenient modifying of the clip rate without the changing of gear members or the use of variable transmissions. Consequently, the clip rate of a particular greens mower is often unchangeable without considerable time and effort.

Additionally, recently there has been an increased interest in greens mowers having a floating or articulating mowing unit. These articulating mowing units have the ability to follow any undulations in the green more closely to provide improve cut quality over varying greens topography. However, it should be appreciated that the mechanical drive unit extending between the internal combustion engine and the articulating mowing unit is often complex and cumbersome due to the inherent need to continually provide drive power as the mowing unit articulates relative to the engine.

Still further, such conventional greens mowers often employ complex disengagement systems that the operator is required to actuate in order to engage and disengage the mowing unit. These systems often require the operator to actuate a lever separate from the handle, which may lead to undesirable cutting performance as the mowing unit is being disengaged.

Accordingly, there exists a need in the relevant art to provide an internal combustion powered greens mowers that is capable of consistently maintaining a desired clip rate that is both reliable and easily configurable. Additionally, there exists a need in the relevant art to provide an internal combustion powered greens mowers that can operably drive an articulating mowing unit without the need for complex mechanical drive systems. Furthermore, there exists a need in the relevant art to provide a greens mower having a simple and safe disengagement system to permit the quick and convenient turning on and off of the mowing unit. Lastly, there is a need in the relevant art to provide a greens mower that overcomes the disadvantages of the prior art.

SUMMARY OF THE INVENTION

An example embodiment of the present invention is directed to a walk-behind greens mower. The mower may include a base and a ground engaging traction member coupled to the base for imparting traction movement to the base for movement along the ground at a given ground speed. An internal combustion engine may be supported on the base for outputting a driving force to the ground engaging traction member. The mower includes a grass cutting reel rotatably supported on the base, and an electric motor supported on the base for driving the grass cutting reel. The mower includes a controller coupled to the electric motor and configured to vary a rotational speed of the grass cutting reel, and a plurality of ground engaging rollers coupled to the electric motor and grass cutting reel. A sensor may be coupled to the traction member for detecting rotational speed of at least one of the ground engaging rollers to output a signal to the controller for determining the drive speed of the mower.

Further areas of applicability of the present invention will become apparent from the detailed description provided hereinafter. It should be understood that the detailed description and specific examples, while indicating an example embodiment of the present invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF AN EXAMPLE EMBODIMENT

Figure 1:
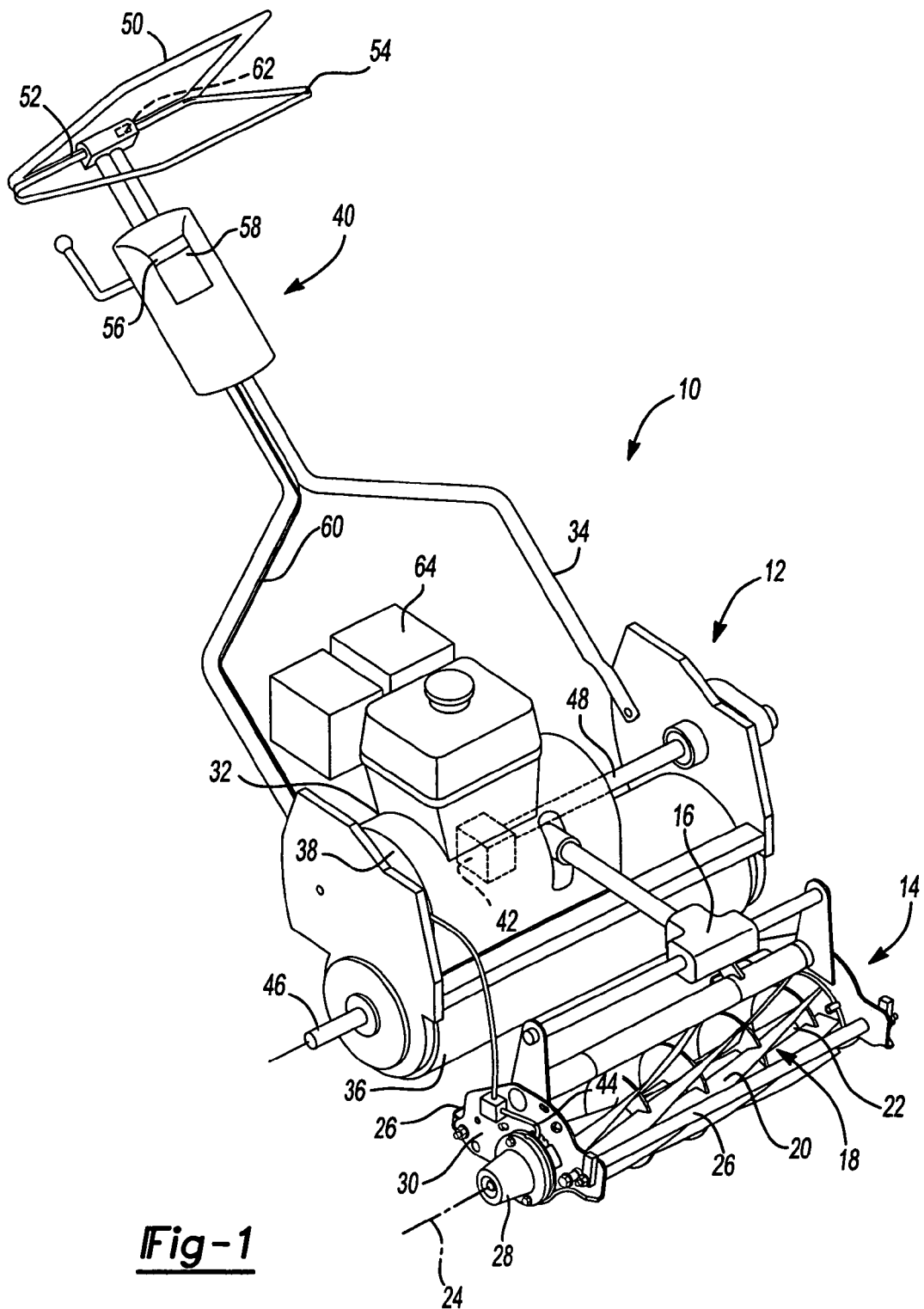
FIG. 1 is a perspective view illustrating a greens mower according to the principles of the present invention.

The following description of an example embodiment is merely exemplary in nature and is in no way intended to limit the invention, its application, or uses.

With reference to the figure, FIG. 1 illustrates a greens mower 10 incorporating the principles of the present invention. Greens mower 10 is a reel-type mower having a base portion 12 and a floating or articulating mowing unit 14. Mowing unit 14 is articulately coupled to base portion 12 through a pivoting mechanism 16.

Mowing unit 14 includes a rotatable greens mower reel 18 having spiraled blades 20 equally spaced around a reel shaft 22. Reel shaft 22 is generally elongated and defines a rotation axis 24 extending along the length of reel shaft 22. A conventional fixed bed knife (not shown) is operably mounted to mowing unit 14. Blades 20 orbit relative to shaft 22 and move past the fixed bed knife for the usual and well-known function of cutting the grass. Mowing unit 14 further includes a pair of ground engaging rollers 26 rotatably mounted along a forward and rearward portion of mowing unit 14. The pair of ground engaging rollers 26 serve to support mowing unit 14 for movement on the ground. The pair of ground engaging rollers 26 may be adjustable to define a cutting height for example.

Mowing unit 14 further includes a variable electric motor 28. Electric motor 28 is illustrated mounted to a side member 30 of mowing unit 14. Electric motor 28 is then operably coupled to reel 18 to rotatably drive reel 18 through a transmission system (not shown). The transmission system may include belts, gears, chains, or the like in a conventional fashion to transfer the drive force from electric motor 28 to reel 18. As should be appreciated, however, the transmission system extending between electric motor 28 and reel 18 is simple in construction, because it is directly mounted to mowing unit 14. Therefore, any articulation of mowing unit 14 does not affect the relative positional relationship of the drive motor and the reel. Consequently, the transmission system need only include certain component pieces to define a range of rotational speeds relative to the capacity of electric motor 28, such as a simple gear train.

Although electric motor 28 is illustrated mounted to side member 30 of mowing unit 14, electric motor 28 may be mounted in any one of a plurality of locations. For example, electric motor 28 may be mounted generally above reel 18, either to one side or centered, or, alternatively, electric motor 28 may be mounted within reel shaft 22 to provide additional protection of electric mower 28 from environmental damage and to provide improved weight balance of mowing unit 14.

Base portion 12 generally includes an internal combustion engine 32, a frame 34, a lawn roller 36, a drive system 38, and a handle assembly 40. Internal combustion engine 32 is of conventional design and is mounted on frame 34. Internal combustion engine 32 may include an electric starter for improved convenience. Internal combustion engine 32 further includes a generator 42 outputting electrical power during engine operation. The electrical power from generator 42 is transferred to electrical motor 28 via a flexible line 44 to drive electrical motor 28 and, thus, reel 18.

Lawn roller 36 is rotatably mounted to frame 34 through a roller axle 46. Lawn roller 36 supports base portion 12 on the ground and serves as the traction drive for greens mower 10. Other ground-supporting traction members could be substituted. Drive system 38 is operably coupled between an output shaft 48 and lawn roller 36. Drive system 38 generally includes a drive pulley (not shown) mounted to output shaft 48 for rotation therewith and an idler pulley (not shown) mounted to lawn roller 36 for rotation therewith. A drive belt (not shown) extends between the drive pulley and the idler pulley to transfer drive force from internal combustion engine 32 to lawn roller 36. Thus, there exists a traction drive train from internal combustion engine 32 to the ground-engaging lawn roller 36 capable of driving greens mower 10 in at least a forward direction.

Handle assembly 40 includes a handle 50 suitably connected with frame 34. Handle 50 includes a grip portion 52 which the operator can hold in steering greens mower 10. A movably mounted bail or operator hand control 54 is pivotally connected to handle 50 and is movable toward and away from the grip portion 52. The operation of hand control 54 may be similar to that disclosed in commonly owned U.S. Pat. No. 6,523,334, in which the portion describing hand control is incorporated in its entirety herein by reference. In this arrangement, the operator can hold both handle 50 and hand control 54 while guiding greens mower 10. Upon release of hand control 54, traction drive system 38 is interrupted in a manner similar to that disclosed in the '334 patent.

Additionally, the vicinity of handle 50 further includes electrical elements 56 mounted thereon, which are therefore presented to the user for observation or actuation. A mower controller 58 is mounted on handle assembly 40.

In an example, mower controller 58 may be embodied as a central processing unit capable of monitoring and controlling the various functions of greens mower 10. Although mower controller 58 may be configured in any number of ways conducive to a desired operation, the mower controller 58 in one example is in electrical communication with electric motor 28 via a wire 60. In this regard, mower controller 58 is capable of controlling a rotational speed of reel 18. This control capability can maintain desired revolutions per minute, irrespective of drive speed of greens mower 10. However, in one example the mower controller 58 may be capable of varying the rotational speed of electric motor 28 and, thus, reel 18 in relation to a detected drive speed of the greens mower 10. The drive speed of greens mower 10 may be detected using a sensor operably coupled to either lawn roller 38 or rollers 26. This sensor outputs a signal in response to a detected rotational speed of lawn roller 38 or rollers 26, which is used by mower controller 58 to determine the drive speed of greens mower 10. Accordingly, an output signal from mower controller 58 to electric motor 28 varies the rotational speed of electric motor 28, thereby varying the clip rate of reel 18.

Furthermore, mower controller 58 may include an operator actuatable switch 62 for conveniently turning on or off electric motor 28 to selectively drive reel 18. The switch 62 may be conveniently located on handle 50 so that the operator need not remove her hands from handle 50 during operation. The switch 62 may thus permit reel 18 to be turned on or off for improved safety and longevity.

Still further, an optional battery 64 may be coupled to frame 34. Battery 64 may be used to aid in the starting of internal combustion engine 32, power electrical elements 56, and/or power electric motor 28, either solely or in combination with generator 42.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A walk-behind greens mower, comprising:
a base;
a ground engaging traction member coupled to the base for imparting traction movement to the base for movement along the ground at a given ground speed;
an internal combustion engine supported on the base for outputting a driving force to the ground engaging traction member;
a grass cutting reel rotatably supported on the base and including a plurality of cutting blades in grass cutting relationship with a bed knife;
an electric motor supported on the base for driving the grass cutting reel;
a controller coupled to the electric motor and configured to vary a rotational speed of the grass cutting reel;
a plurality of ground engaging rollers coupled to the electric motor and grass cutting reel; and
a sensor coupled to the traction member for detecting rotational speed of at least one of the ground engaging rollers to output a signal to the controller for determining the drive speed of the mower.

2. The greens mower according to claim 1, wherein the controller is operable to vary a rotational speed of the electric motor so as to vary a clip rate of the grass cutting reel.

3. The greens mower according to claim 1, wherein the controller varies a rotational speed of the electric motor based on the received signal to vary a clip rate of the grass cutting reel.

4. The greens mower according to claim 1, further comprising:
an articulating portion mounted to the base for movement relative to the base, and for supporting the electric motor and grass cutting reel.

5. The greens mower according to claim 4, wherein the ground engaging rollers are rotatably coupled to and support the articulating portion upon the ground.

6. The greens mower according to claim 1, further comprising:
a generator operably coupled to the internal combustion engine for outputting electricity to power the electric motor in response to internal combustion engine operation.

7. The greens mower according to claim 1, further comprising:
a battery configured to output electricity to the electric motor.

8. A walk-behind greens mower comprising:
a base;
a ground engaging traction member coupled to the base and imparting traction movement to the mower;
an internal combustion engine supported on the base for outputting a driving force to the ground engaging traction member;
an articulating portion mounted to the base for movement relative to the base;
a grass cutting reel supported on the articulating portion and having a plurality of cutting blades in cutting relationship with a bed knife;
an electric motor supported on the articulating portion for driving the grass cutting reel;
a controller coupled to the electric motor and configured to vary a clip rate of the grass cutting reel;
a plurality of ground engaging rollers coupled to the electric motor and grass cutting reel; and
a sensor coupled to the traction member for detecting rotational speed of at least one of the ground engaging rollers to output a signal to the controller for determining the drive speed of the mower.

9. The greens mower according to claim 8, wherein the controller is operable to vary a rotational speed of the electric motor so as to vary the clip rate of the grass cutting reel.

10. The greens mower according to claim 8, wherein the controller varies a rotational speed of the electric motor based on the received signal to vary the clip rate of the grass cutting reel.

11. The greens mower according to claim 8, wherein the ground engaging rollers are rotatably coupled to and support the articulating portion upon the ground.

12. The greens mower according to claim 8, further comprising:
a generator operably coupled to the internal combustion engine for outputting electricity to power the electric motor in response to internal combustion engine operation.

13. The greens mower according to claim 8, further comprising:
a battery configured to output electricity to the electric motor.

* * * * *